United States Patent
Yanase et al.

[11] Patent Number: 5,826,938
[45] Date of Patent: Oct. 27, 1998

[54] VEHICLE SEAT WITH SIDE AIR BAG ASSEMBLY

[75] Inventors: Hitoshi Yanase, Toyota; Hisaaki Kato, Anjyo; Masanori Oyabu, Toyota; Yasunori Hasegawa, Kasugai; Mitsuyoshi Ohno, Toyota, all of Japan

[73] Assignees: Araco Kabushiki Kaisha; Toyota Jidosha Kabushiki Kaisha, both of Aichi-ken, Japan

[21] Appl. No.: 728,492

[22] Filed: Oct. 9, 1996

[30] Foreign Application Priority Data

Oct. 11, 1995 [JP] Japan .................................. 7-263239

[51] Int. Cl.⁶ .................................................. B60R 21/22
[52] U.S. Cl. ................................ 297/216.13; 280/728.3; 280/730.2
[58] Field of Search ............................. 280/730.2, 728.3; 297/216.13, 216.12

[56] References Cited

U.S. PATENT DOCUMENTS

| | | |
|---|---|---|
| 3,985,374 | 10/1976 | Powaska . |
| 5,072,966 | 12/1991 | Nishitake et al. .................... 280/730.2 |
| 5,112,079 | 5/1992 | Haland et al. . |
| 5,222,761 | 6/1993 | Kaji et al. . |
| 5,251,931 | 10/1993 | Semchena et al. . |
| 5,348,342 | 9/1994 | Haland et al. . |
| 5,435,594 | 7/1995 | Gille . |
| 5,447,328 | 9/1995 | Iannazzi et al. ...................... 280/728.3 |
| 5,449,197 | 9/1995 | Kerner ............................... 280/728.3 X |
| 5,456,490 | 10/1995 | Carter et al. .......................... 280/728.3 |
| 5,478,105 | 12/1995 | Yamakawa et al. ................. 280/728.3 |
| 5,487,558 | 1/1996 | Ball et al. ............................ 280/728.3 |
| 5,499,840 | 3/1996 | Nakano ............................ 280/730.2 X |
| 5,536,038 | 7/1996 | Bollaert et al. ...................... 280/730.2 |
| 5,553,887 | 9/1996 | Karlow et al. .................... 280/728.3 X |
| 5,611,564 | 3/1997 | Bauer ................................... 280/728.3 |
| 5,626,357 | 5/1997 | Leonard et al. ...................... 280/728.3 |

FOREIGN PATENT DOCUMENTS

| | | |
|---|---|---|
| 22226275 | 12/1973 | Germany . |
| 403281455 | 12/1991 | Japan ................. 280/730 A |
| 4-50052 | 2/1992 | Japan . |
| 4-166452 | 6/1992 | Japan . |
| 4-356246 | 12/1992 | Japan . |
| 6-278512 | 10/1994 | Japan . |
| 6-328992 | 11/1994 | Japan . |

*Primary Examiner*—Peter M. Cuomo
*Assistant Examiner*—David E. Allred
*Attorney, Agent, or Firm*—Hazel & Thomas

[57] ABSTRACT

A vehicle seat is equipped with a side air bag assembly, the air bag of which is assembled within a side cavity formed in one side of a back rest of the vehicle seat in a folded condition. A rear attachment board is mounted on a support frame of the back rest, and has a back portion formed to cover the rear face of the back rest and a side portion formed to cover the air bag in the side cavity. The side portion of the rear attachment board is formed as a door portion to be opened outwardly when applied with a thrusting force caused by inflation of the air bag.

11 Claims, 7 Drawing Sheets

Fig.9(a)    Fig.9(b)
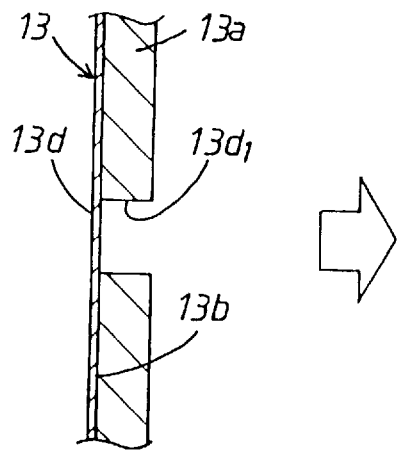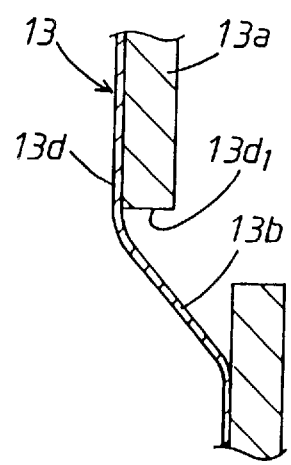
Fig.10(a)    Fig.10(b)
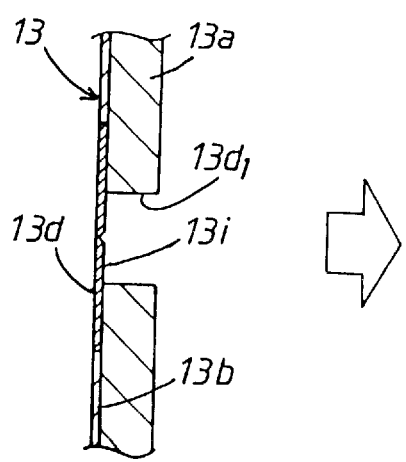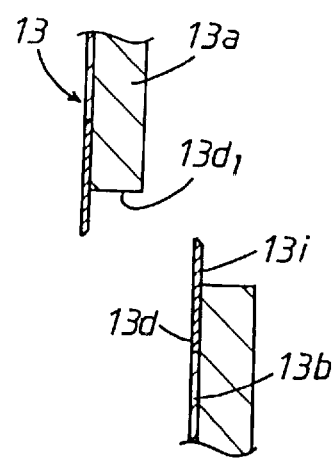

VEHICLE SEAT WITH SIDE AIR BAG ASSEMBLY

BACKGROUND OF THE INVENTION

1. Field of the Invention

The present invention relates to a vehicle seat equipped with a side air bag assembly mounted within one side of a back rest of the vehicle seat to ensure safety of a passenger from a great impact applied to a side portion of the vehicle body from the exterior in the occurrence of collision.

2. Description of the Prior Art

In Japanese Patent Laid-open Publication No. 4(1992)-356246, there has been proposed a vehicle seat equipped with a side air bag assembly of this type which is composed of a casing housed within a side cavity formed in one side of a back rest of the vehicle seat and fixed to a support frame of the back rest, an inflator contained within the casing, an air bag assembled within the casing in a folded condition to be inflated by activation of the inflator and an air bag lid assembled with the casing to cover an opening of the side cavity. The air bag lid is hinged with an opening end of the casing at its base end to be opened outwardly when applied with a thrusting force caused by inflation of the air bag.

In conventional side air bag assembly, it is difficult to adjust a load acting on the air bag at the hinged portion of the air bag lid. In a condition where the side air bag assembly has been mounted within the one side of the back rest, the air bag lid is exposed to the exterior. This deteriorates the appearance of the vehicle seat. There is also a fear that the air bag lid may be mischievously opened by hand. In the case that the air bag lid is covered with the seat cover of the back rest to avoid the foregoing problems, it is required to properly adjust a seamed portion of the seat cover where the air bag lid is opened outwardly to permit inflation of the air bag. However, the destruction strength of the seam portion is greatly influenced by the outer skin material of the seat cover and sewing thread. For this reason, the outer skin material of the seat cover is limited to an outer skin material such a vinyl chloride leather or a thin knitted cloth breakable at the seamed portion, and the sewing thread is also limited to a thread releasable at the seamed portion. In the case that a natural leather or a thick knitted cloth is used as the seat cover, it is required that the explosive force of the inflator be increased.

SUMMARY OF THE INVENTION

It is, therefore, a primary object of the present invention to provide a vehicle seat equipped with a side air bag assembly wherein the back rest of the vehicle can be designed in a desired form of high quality without any restriction to the material and design of the seat cover.

According to the present invention, the object is accomplished by providing a vehicle seat equipped with a side air bag assembly the air bag of which is assembled within a side cavity formed along one side of a back rest of the vehicle seat in a folded condition, wherein a rear attachment board is mounted on a support frame of the back rest. The rear attachment board has a back portion formed to cover the rear face of the back rest and a side portion formed to cover the air bag in the side cavity, and the side portion of the rear attachment board is formed as a door portion to be opened outwardly when applied with a thrusting force caused by inflation of the air bag.

BRIEF DESCRIPTION OF THE DRAWINGS

Other objects, features and advantages of the present invention will be more readily appreciated from the following detailed description of a preferred embodiment and modifications thereof when taken together with the accompanying drawings, in which:

FIG. 9(a) is a vertical sectional view of a second modification of the rear attachment board, corresponding with FIG. 7(a);

FIG. 9(b) is a vertical sectional view of the second modification of the rear attachment board, corresponding with FIG. 7(b);

FIG. 10(a) is a vertical sectional view of a third modification of the rear attachment board, corresponding with FIG. 7(a); and FIG. 10(b) is a vertical sectional view of the third modification of the rear attachment board, corresponding with FIG. 7(b).

DESCRIPTION OF THE PREFERRED EMBODIMENTS

Figure 1:
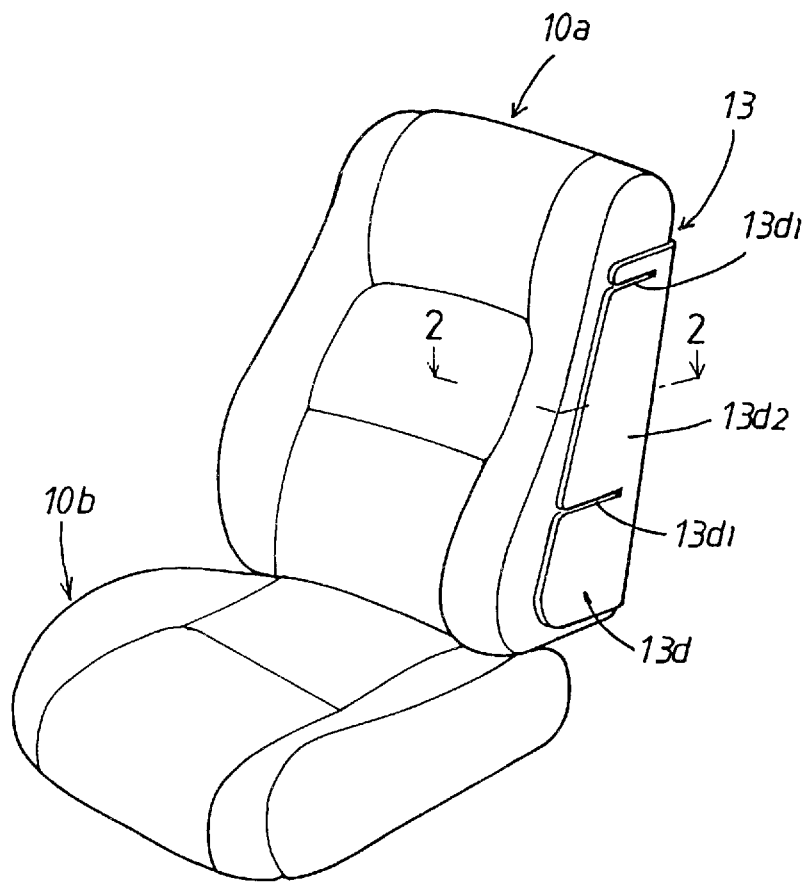
FIG. 1 is a vehicle seat equipped with a side air bag assembly in accordance with the present invention.
Figure 2:
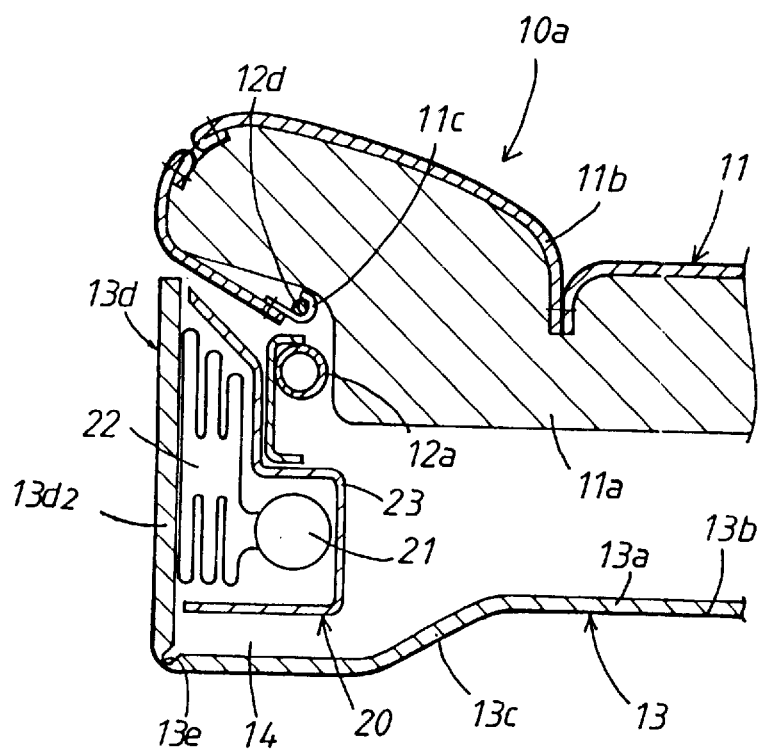
FIG. 2 is a sectional view taken along line 2—2 in FIG. 1.
Figure 4:
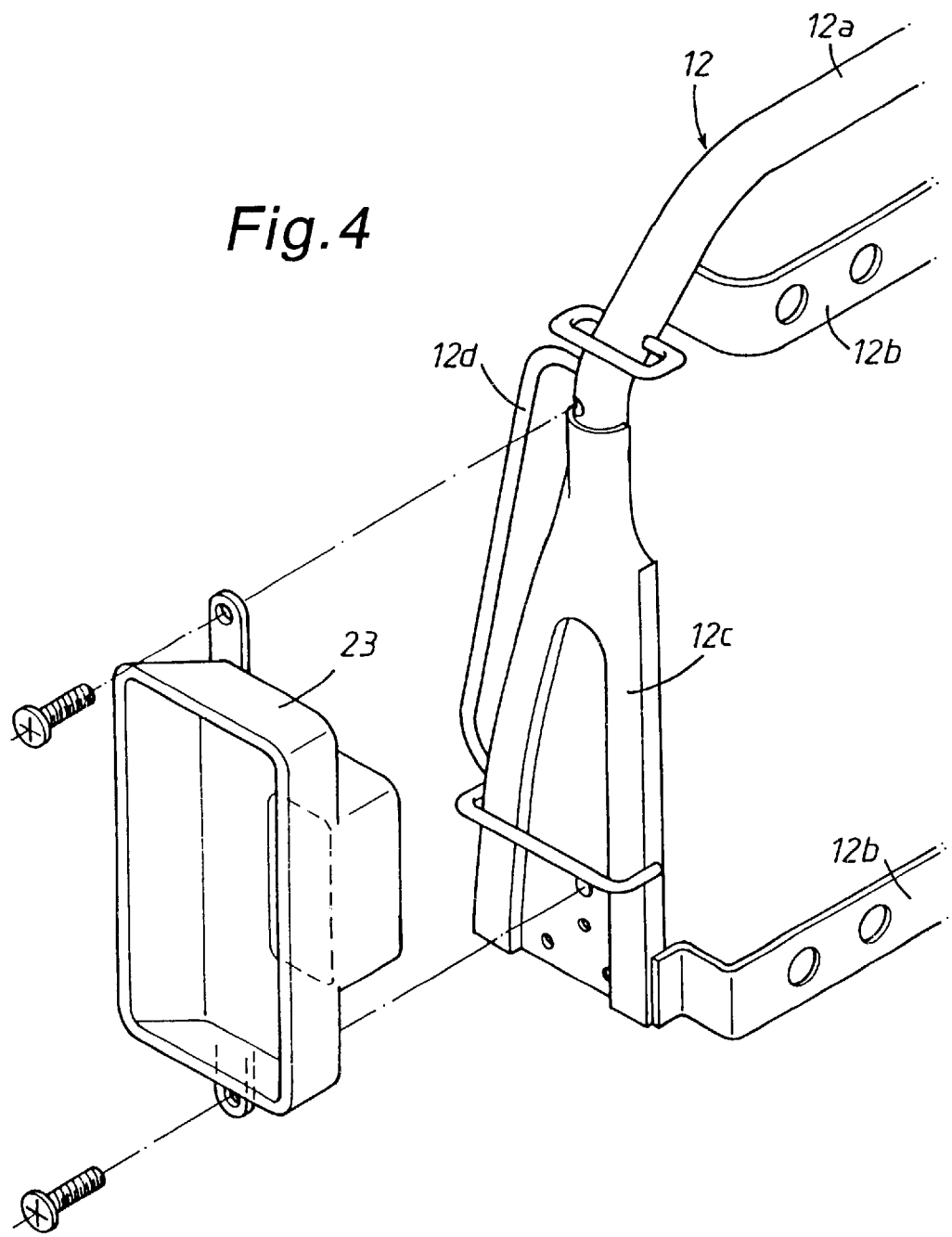
FIG. 4 is a perspective view of a back frame assembly of a back rest of the vehicle seat shown in FIG. 1 and a casing to be mounted on one side of the back frame.

Illustrated in FIG. 1 of the drawings is a vehicle seat equipped with a side air bag assembly 20 mounted within one side of a back rest 10a of the vehicle seat as shown in FIG. 2. The back rest 10a of the vehicle seat is in the form of a back rest cushion 11 supported by a back frame assembly 12 shown in FIG. 4. The back rest cushion 11 is composed of a cushion pad 11a covered with a seat cover 11b. As shown in FIG. 4, the back frame assembly 12 is composed of a U-shaped main frame 12a, a pair of vertically spaced lateral support members 12b fixed to the main frame 12a, a pair of vertical brackets 12c fixed to the opposite sides of the main frame 12a and a pair of support rods 12d fixed to the opposite sides of main frame 12a. As shown in FIG. 2, the seat cover 11b is provided at its opposite sides with a plurality of hooks 11c which are engaged with the support rods 12d of back frame assembly 12 to retain the cushion pad 11a on the back frame assembly 12.

The side air bag assembly 20 is housed within a side cavity 14 formed by a rear attachment board 13 which is fixed to the lateral support members 12b of back frame assembly 12 and spaced in a predetermined distance from the rear face of back rest cushion 11. The rear attachment board 13 is in the form of a base plate 13a covered with an outer skin material 13b. The rear attachment board 13 has a back portion 13c formed to cover the rear face of back rest cushion 11 and a pair of laterally spaced side portions 13d formed to cover both the side faces of back rest cushion 11. The side cavity 14 has a vertical rectangular opening covered by the side portion 13d of rear attachment board 13.

The air bag assembly 20 includes an inflator 21 housed within a casing 23 mounted on the vertical bracket 12c of back frame assembly 12 as shown in FIG. 4 and an air bag 22 connected with the inflator 21 and contained in the casing 23 in a folded condition. The inflator 21 is connected to a collision sensor (not shown) mounted on a side portion of the vehicle body such as a side door. When the occurrence of collision at the side portion of the vehicle body is detected by the collision sensor, the inflator 21 is activated by an electric signal applied from the collision sensor under control of an electric controller (not shown) to inflate the air bag 22 at a side portion of the back rest 10a as shown in FIG. 3.

Figure 5:
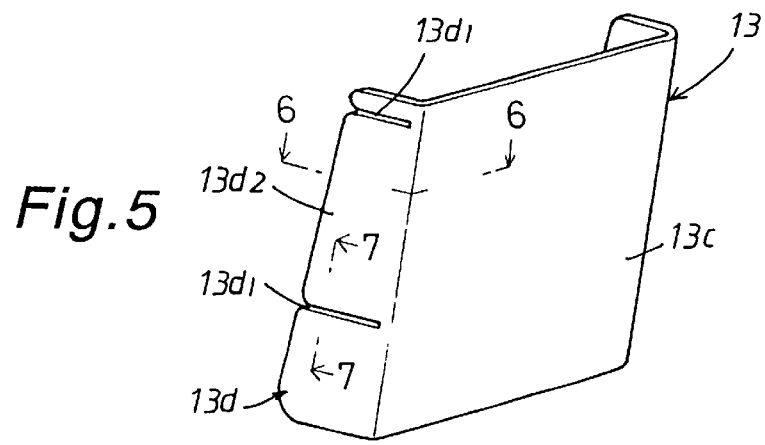
FIG. 5 is a rear view of a rear attachment board assembled with the back rest of the vehicle seat shown in FIG. 1.
Figure 6A:
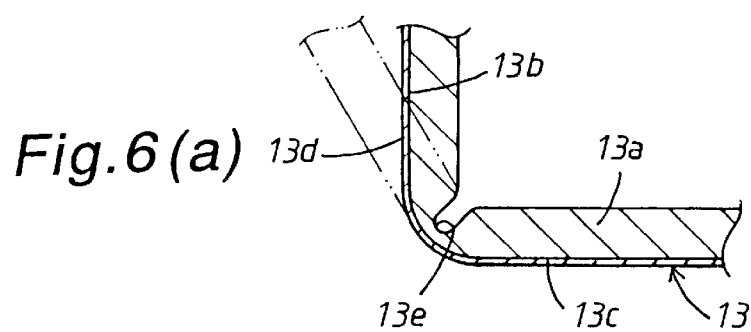
FIG. 6(a) is a cross-sectional view taken along line 6—6 in FIG. 5.

As shown in FIGS. 1 and 5, one of the side portions 13d of the rear attachment board 13 is formed with a pair of vertically spaced lateral slits $13d_1$ which are extended to a position adjacent a corner between the back portion 13c and side portion 13d of the rear attachment board 13. The lateral slits $13d_1$ are formed in such a manner as to completely cut off the base plate 13a and outer skin material 13b of the rear attachment board 13. As shown in FIG. 6(a) the rear attachment board 13 is further formed at its internal surface with a vertical groove 13e which is located at the corner of the back portion 13c and side portion 13d between the lateral slits $13d_1$. With the vertical groove 13e, the corner between the back portion 13c and side portion 13d of rear attachment board 13 is formed as a hinge portion, and the side portion 13d of rear attachment board 13 between the lateral slits 13d, is formed as a door portion $13d_2$ to be opened outwardly when applied with a thrusting force from the interior.

Figure 3:
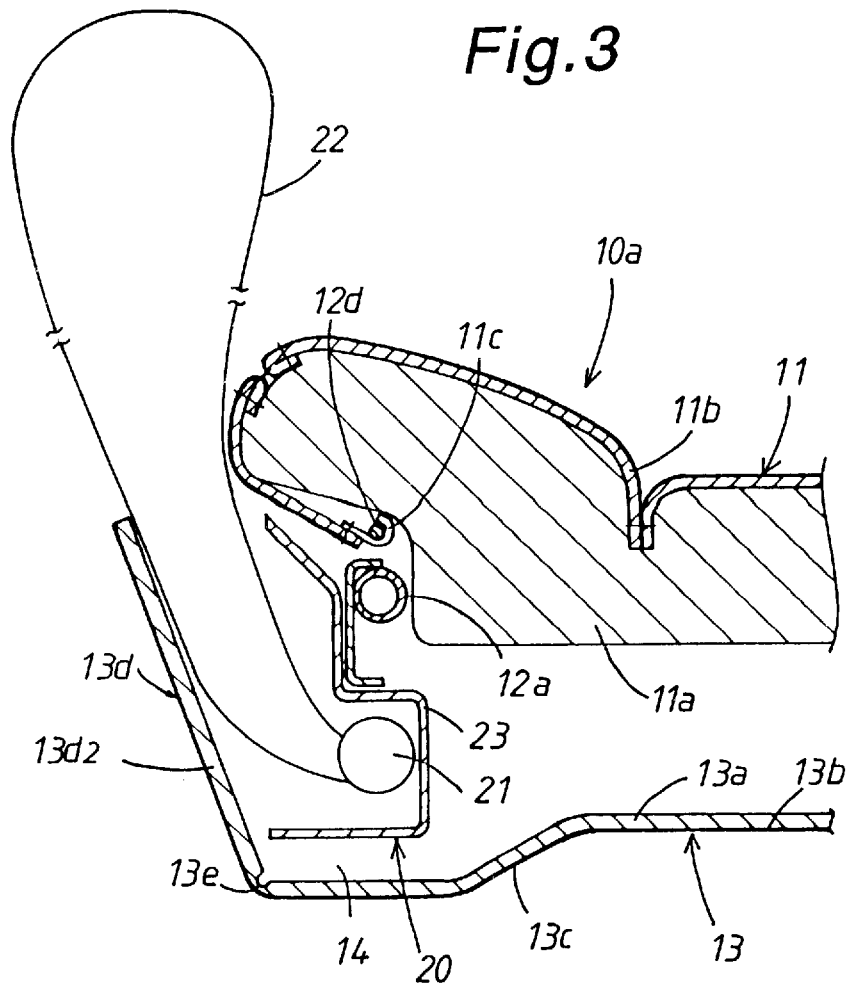
FIG. 3 is a sectional view illustrating an inflated condition of an air bag in the side air bag assembly shown in FIG. 2.
Figure 7A:
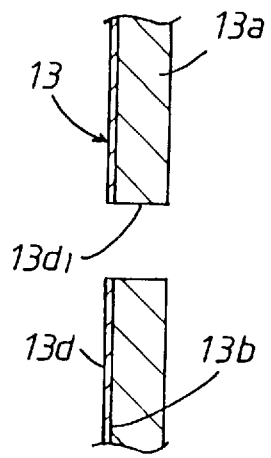
FIG. 7(a) is a vertical sectional view of the rear attachment board taken along line 7—7 in FIG. 5 in a folded condition of the air bag.
Figure 7B:
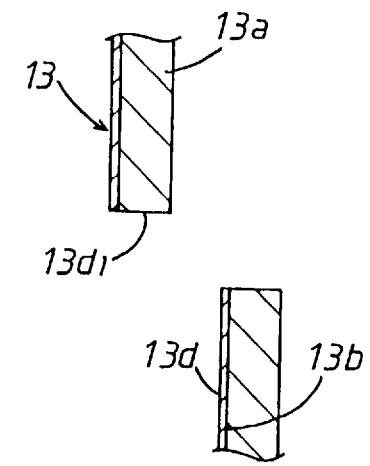
FIG. 7(b) is a vertical sectional view of the rear attachment board taken along line 7—7 in FIG. 5 in an inflated condition of the air bag.

Assuming that the air bag 22 has been inflated by activation of the inflator 21 in the occurrence of collision at the side portion of the vehicle, the door portion $13d_2$ of rear attachment board 13 is opened outwardly by a thrusting force applied thereto from the interior to permit the inflation of the air bag 22 as shown in FIG. 3. In this instance, the lateral slits 13d, of rear attachment board 13 are expanded as shown in FIG. 7(b).

Since in the vehicle seat, the side portion 13d of rear attachment board 13 between the lateral slits $13d_1$ is formed as the door portion $13d_2$ to permit inflation of the air bag 22, a load acting on the air bag 22 can be adjusted in a simple manner at the hinge portion of rear attachment board 13. Thus, the back rest 10a of the vehicle seat can be designed in a desired form without any restriction to the material and design of the seat cover 11b to provide a vehicle seat of high quality with a superior appearance. In addition, maintenance and inspection of the air bag assembly 20 can be carried out in a simple manner by removal of the rear attachment board 13 from the back frame assembly 12.

Figure 6B:
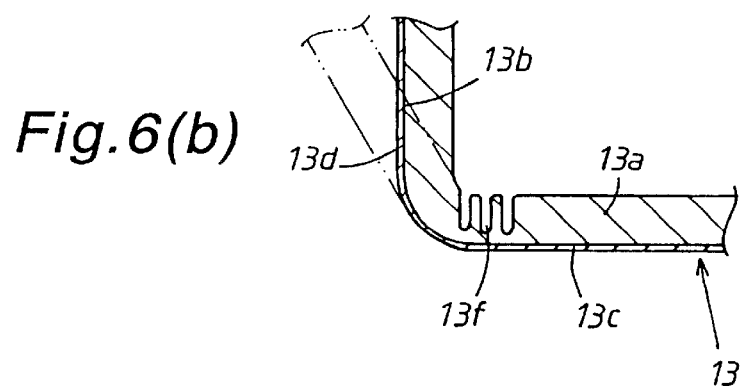
FIG. 6(b) is a cross-sectional view of a modification of the rear attachment board.
Figure 6C:
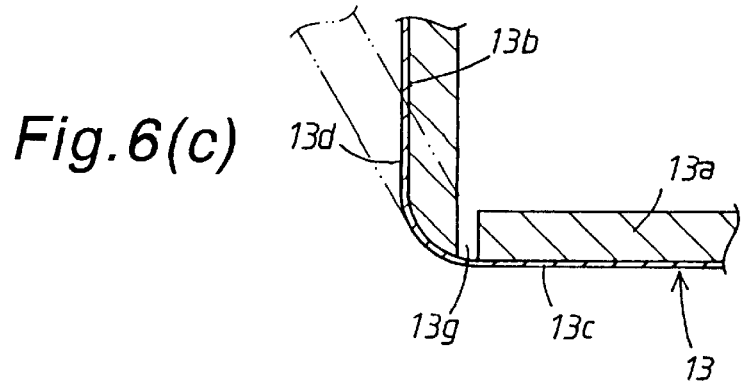
FIG. 6(c) is a cross-sectional view of another modification of the rear attachment board.

Illustrated in FIG. 6(b) is a modification of the hinge portion of the rear attachment board 13, wherein the base plate 13a of attachment board 13 is formed with a plurality of parallel vertical grooves 13f between the lateral slits $13d_1$ so that a hinge portion is formed by the outer skin material 13b at the corner between the back portion 13c and side portion 13d of the rear attachment board 13. In FIG. 6(c) there is illustrated another modification of the hinge portion of the rear attachment board 13, wherein the base plate 13a of attachment board 13 is formed with a vertical slit 13g between the lateral slit $13d_1$ so that a hinge portion is formed by the outer skin material 13b at the corner between the back portion 13c and side portion 13d of the rear attachment board 13.

Figure 8A:
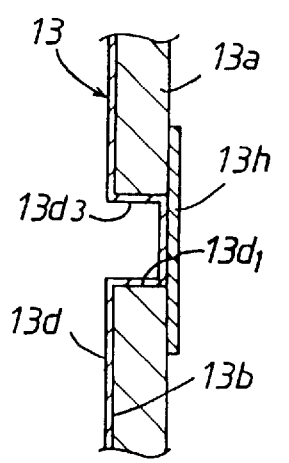
FIG. 8(a) is a vertical sectional view of a first modification of the rear attachment board, corresponding with FIG. 7(a)
Figure 8B:
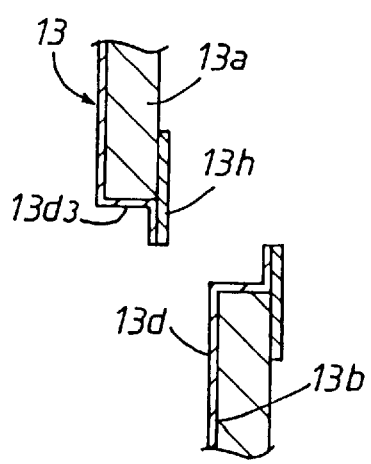
FIG. 8(b) is a vertical sectional view of the first modification corresponding with FIG. 7(b)

In FIG. 8(a) there is illustrated a first modification of the lateral slits $13d_1$ of attachment board 13, wherein a backing plate 13h is adhered to an internal surface of the base plate 13a respectively at the lateral slits $13d_1$ while the outer skin material 13b is inwardly folded respectively at the lateral slits and adhered to the backing plate 13h to form a lateral groove $13d_3$. In this modification, the outer skin material 13b and backing plate 13h are cut off at the center of the lateral groove $13d_3$ to be separated as shown in FIG. 8(b) when applied with a thrusting force caused by inflation of the air bag 22. Illustrated in FIG. 9(a) is a second modification of the lateral slits $13d_1$ of attachment board 13, wherein the lateral slits $13d_1$ each are covered with the outer skin material 13b adhered to the base plate 13a to be removed therefrom as shown in FIG. 9(b) when applied with a thrusting force from the interior. In FIG. 10(a) there is illustrated a third modification of the lateral slits $13d_1$ of attachment board 13, wherein a connecting plate 13i is adhered to the base plate 13a to cover the lateral slit $13d_1$. In this modification, the connecting plate 13i is formed with a lateral v-groove at the center of lateral slit 13d, to be broken as shown in FIG. 10(b) when applied with a thrusting force from the interior.

What is claimed is:

1. A vehicle seat equipped with a side air bag assembly, the side air bag assembly comprising:
    an air bag assembled in a folded condition within a side cavity formed in one side face of a back rest of the vehicle seat, said back rest having a front face, at least one said side face and a rear face, said side cavity extending in a vertical direction; and
    a rear attachment board mounted on a support frame of said back rest and having a back portion forming the rear face of said back rest and a side portion covering said side cavity and the air bag in said side cavity, wherein
    the side portion of said rear attachment board is formed as a door operatively connected to open outwardly in a lateral direction when receiving a thrusting force caused by inflation of said air bag and
    the back portion of said rear attachment board is mounted on said support frame so as to be fixedly spaced from a rear face of a cushion of said back rest, said cushion being attached to said support frame forming at least front face of said back rest.

2. A vehicle seat as claimed in claim 1, wherein said rear attachment board is formed with a hinge portion at a corner between said back portion and said side portion thereof.

3. A vehicle seat as claimed in claim 2, wherein said rear attachment board is composed of a base plate covered with an outer skin material, and wherein the base plate of said attachment board is formed at its internal surface with a vertical groove at the corner between said back portion and said side portion to provide said hinge portion.

4. A vehicle seat as claimed in claim 2, wherein said rear attachment board is composed of a base plate covered with an outer skin material, and wherein the base plate of said attachment board is formed at its internal surface with a plurality of vertical grooves at the corner between said back portion and side portion to provide said hinge portion.

5. A vehicle seat as claimed in claim 2, wherein said rear attachment board is composed of a base plate covered with an outer skin material, and wherein the base plate of said attachment board is formed with a vertical slit at the corner between said back portion and side portion to provide said hinge portion.

6. A vehicle seat as claimed in claim 1, wherein the side portion of said rear attachment board is formed with a pair of vertically spaced lateral slits at a place opposed to an opening of the side cavity in said back rest, a hinge portion is formed at a corner of the back portion and side portion of said rear attachment board located between said lateral slits, and the side portion of said rear attachment board located between said lateral slits is formed as said door to be opened outwardly when receiving a thrusting force caused by inflation of said air bag.

7. A vehicle seat as claimed in claim 3, wherein said rear attachment board is composed of a base plate covered with an outer skin material, and wherein said lateral slits are covered with the outer skin material of said base plate.

8. A vehicle seat as claimed in claim 3, wherein said rear attachment board is composed of a base plate covered with an outer skin material, and wherein a backing plate is adhered to an internal surface of said base plate respectively at said lateral slits while the outer skin material is inwardly folded respectively at said lateral slits and adhered to the backing plate to form a lateral groove, said outer skin material and said backing plate being cut off at the center of the lateral groove to be separated when applied with a thrusting force caused by inflation of said air bag.

9. A vehicle seat, comprising:

a seat cushion;

a back rest having a front face, at least one side face and a rear face, said back rest having defined therein a side cavity formed in said one side face and extending along said side face in a vertical direction, and said back rest further including a support frame and a cushion attached to said support frame forming at least the front face of said back rest;

an air bag operatively positioned in a folded condition in said side cavity; and a rear attachment board mounted to said support frame of said back rest so as to be fixedly spaced from a rear face of said cushion, said rear attachment board including a back portion forming the rear face of said back rest and a side portion covering said side cavity and said folded air bag therein, wherein said side portion of said rear attachment board is in the form of a door operatively connected to open outwardly in a lateral direction when inflation of said air bag out of said side cavity generates an outward thrusting force against said door.

10. A vehicle seat according to claim 9, wherein said rear attachment board further includes a hinge device connecting said door to said rear portion.

11. A vehicle seat according to claim 9, wherein said rear attachment board further includes a hinge device connecting said door to said rear portion, and said side portion has defined thereon two lateral slits vertically spaced apart from each other such that said two lateral slits and said hinge device define said door, said two lateral slits being formed whereby inflation of said air bag will break off said lateral slits and open said door via said hinge device.

* * * * *